May 3, 1927.
R. A. FEISS
1,626,799
VENT FOR FULL LINED GARMENTS AND METHOD OF MAKING IT
Filed Jan. 22, 1923   3 Sheets-Sheet 1
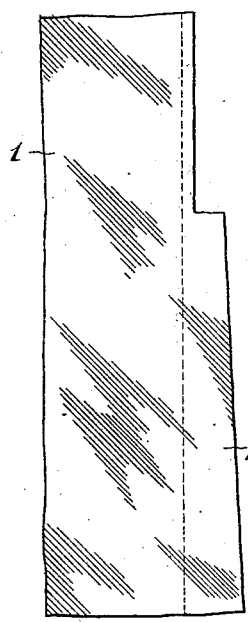
FIG. I.
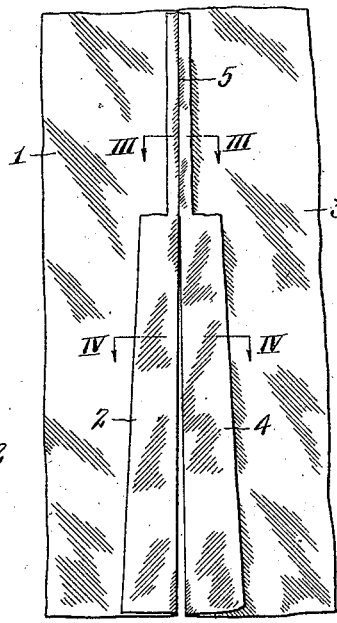
FIG. II.
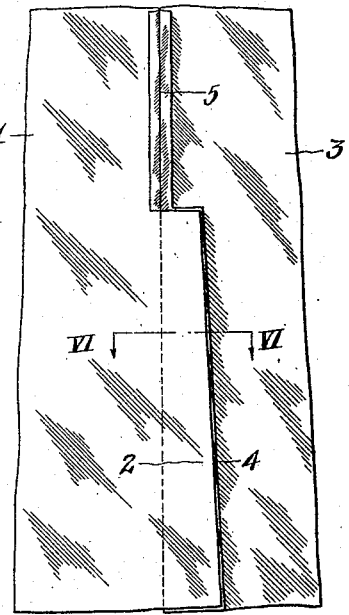
FIG. V.
FIG. III.
FIG. IV.
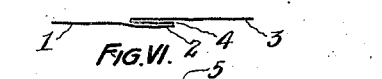
FIG. VI.
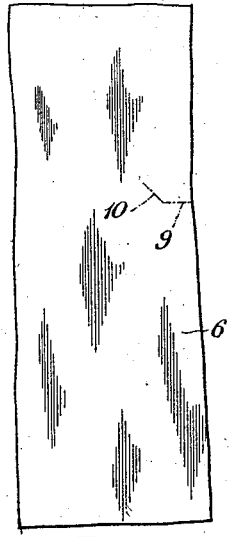
FIG. VII.
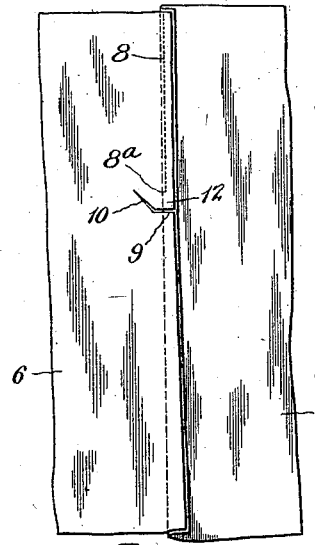
FIG. VIII.
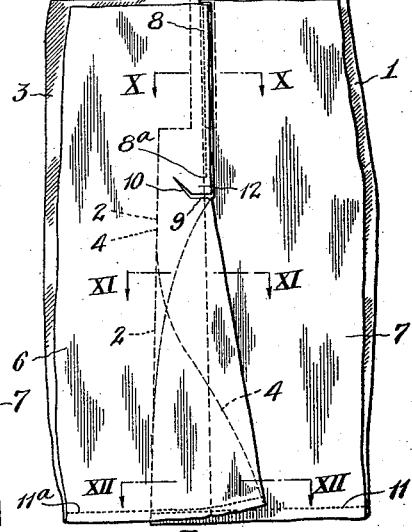
FIG. IX.
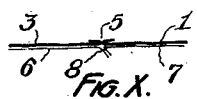
FIG. X.
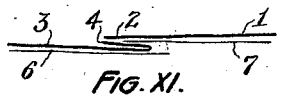
FIG. XI.
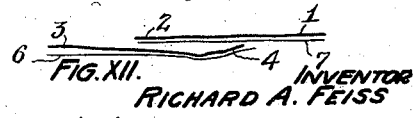
FIG. XII.
INVENTOR
RICHARD A. FEISS
by his att'y.

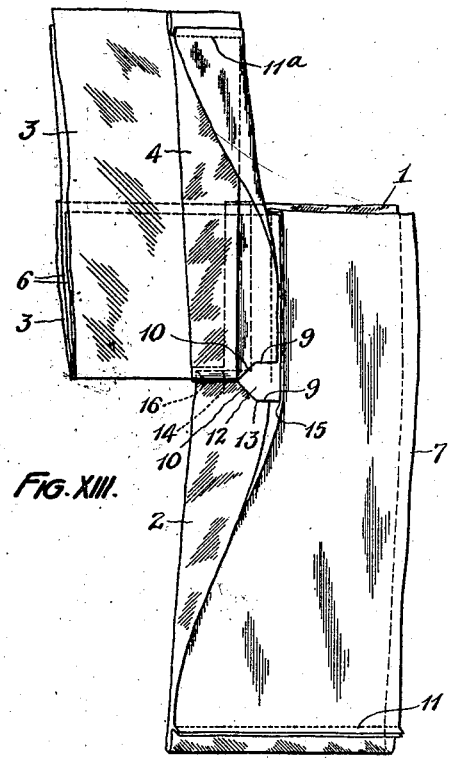

May 3, 1927. 1,626,799
R. A. FEISS
VENT FOR FULL LINED GARMENTS AND METHOD OF MAKING IT
Filed Jan. 22, 1923 3 Sheets-Sheet 3
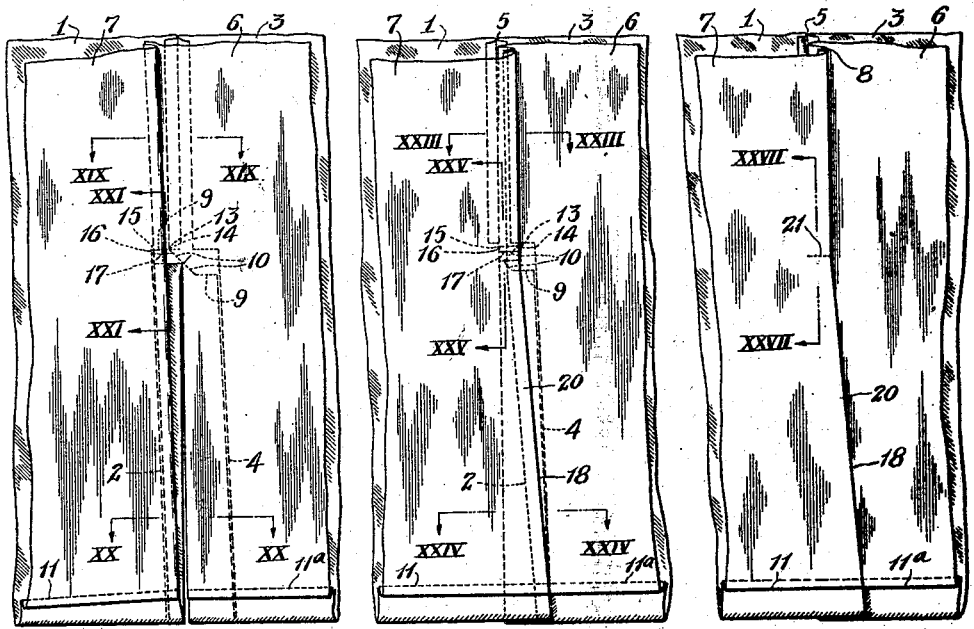
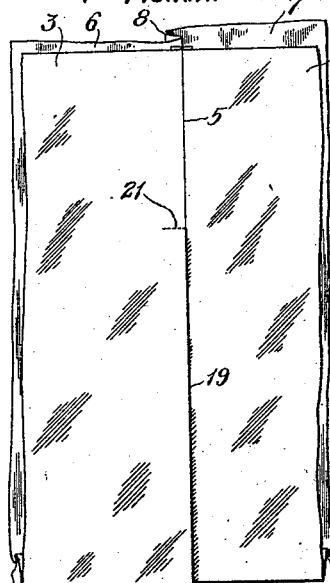
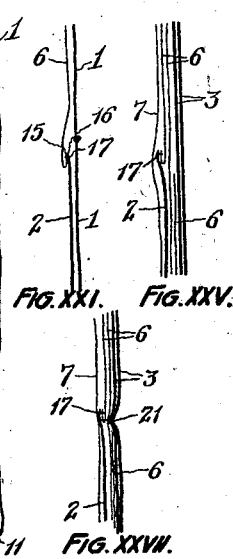
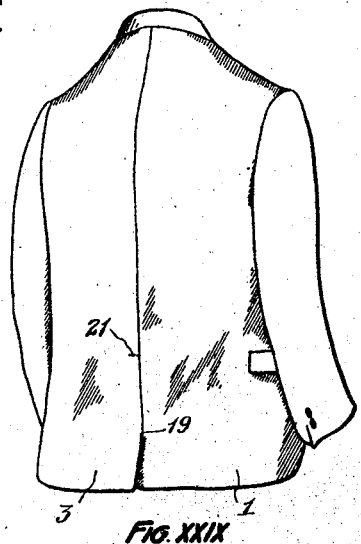
INVENTOR:
RICHARD A. FEISS Patented May 3, 1927.

1,626,799

UNITED STATES PATENT OFFICE.

RICHARD A. FEISS, OF CLEVELAND, OHIO, ASSIGNOR TO THE JOSEPH & FEISS CO., OF CLEVELAND, OHIO.

VENT FOR FULL-LINED GARMENTS AND METHOD OF MAKING IT.

Application filed January 22, 1923. Serial No. 614,078.

My invention pertains to an improved vent for a full lined garment such for instance as, full lined sack coats or overcoats.

Fully lined garment vents as now commonly constructed by the trade, so far as my knowledge extends, involve some hand work. Usually, one side of the vent is basted whereas the other side of the vent is basted at least at the top, and the basting stitch is also relied upon below the notch of the vent.

The object of my invention is to eliminate all basting operations and to make possible the substitution therefor of machine stitching. I have realized the successful accomplishment of that object by the origination of a new series of steps. A neater, less expensive and more durable garment has resulted from the employment of my novel method.

The following steps of my method to produce a new article of manufacture are enumerated:

(1) Cutting half backs of coat material; (2) stitching back seam of coat sections down to the top of the vent; (3) pressing open the back seam of the coat and pressing flap of right half back against the left half back; (4) cutting the half backs from lining material; (5) seaming the two lining half backs together along a portion of their bordering edges; (6) notching one half back of the lining; (7) attaching the lining to the coat material along all edges except the lower edge; (8) turning the coat dummy inside out; (9) seaming the lining to the coat along the bottom; (10) folding back the attached coat and lining sections of one-half back preparatory to machine stitching the notch after turning to a new position a corner section of the lining bordering one side of the notch; (11) machine stitching the notch; (12) sewing the lining to the coat material on one side of the vent from the bottom up to and slightly past the middle back seam; (13) sewing the lining to the coat fabric on the other side of the vent from the top to the bottom of the entire back; (14) turning the coat right side out and pressing one side of the vent construction to its proper overlapping position; (15) stitching through all of the pieces across the top of the vent.

Adverting to the drawings:

Figure I is a plan view of one of two duplicate half backs of a coat fabric.

Figure II is an inside view of the two duplicate halves of the coat fabric after they had been seamed together down to the top of the vent and showing two folded vent flaps.

Figure III is a section on line III—III of Figure II.

Figure IV is a section on line IV—IV of Figure II.

Figure V is a view similar to Figure II showing the seam pressed open and the flap on the right half back overlapping and pressed upon the left half.

Figure VI is a section on line VI—VI of Figure V.

Figure VII is a plan view of one of two duplicate lining half backs of lining material showing in dotted lines where a notch is later to be cut in the left lining half back.

Fig. VIII illustrates the two lining half backs seamed together to a predetermined point and shows the notch cut into the left half back.

Figure IX is a view of the garment section under construction turned inside out showing the lining attached along its top, two side edges and along the bottom to opposite sides of the vent.

Figure X is a section on line X—X of Figure IX.

Figure XI is a section on line XI—XI of Figure IX.

Figure XII is a section on line XII—XII of Figure IX.

Figure XIII is a view similar to Figure IX though showing the left half back with its lining folded or thrown back to afford access to a machine stitching needle for securing a corner of the lining to one flap of the coat material.

Figure XIV is a use similar to Figure XIII after the notch bordering corner has been stitched.

Figure XV is a view showing the half which had been temporarily drawn back again in its depending position and after the right side of the vent has been seamed up to the lower end of the middle back stitch.

Figure XVI is a section on line XVI—XVI of Figure XV.

Figure XVII is a view of the vent bordering area showing the left half of the vent thrown back and the right side of the vent seamed up to the bottom of the notch.

Figure XVIII is an inside view of the vent portion of the coat turned right side out and with the left portion of the lining drawn to the left to expose the notch.

Figure XIX is a section on line XIX—XIX of Figure XVIII.

Figure XX is a section on line XX—XX of Figure XVIII.

Figure XXI is a section on line XXI—XXI of Figure XVIII.

Figure XXII is a view corresponding to Figure XVIII with the right half of the lining folded over to its proper place and pressed so that it overlaps the left side.

Figure XXIII is a section on line XXIII—XXIII of Figure XXII.

Figure XXIV is a section on line XXIV—XXIV of Figure XXII.

Figure XXV is a section on line XXV—XXV of Figure XXII.

Figure XXVI is a view like Figures XVIII and XXII with the final machine stitch added.

Figure XXVII is a section on line XXVII—XXVII of Figure XXVI.

Figure XXVIII is an outside view of the finished vent portion of the coat.

Figure XXIX is a view of the complete garment.

For a clear understanding of the drawings of this application it is stated at the outset that the cloth of the coat is lightly surface shaded diagonally to distinguish it from the lining material which is lightly shaded vertically, also, the stitches are indicated by short dots whereas the concealed edges of the material will be shown with the usual dotted lines.

Figure I illustrates one of two duplicate half backs of the exterior garment fabric each being provided along a portion of its length with a laterally extended portion which will act as a flap or a fold. The one half back 1 has a flap 2 and the other half back 3 has a flap 4. The half backs 1 and 3 are seamed together in the ordinary way along a line 5 terminating at the commencement of the flaps 2 and 4 which in Figure II are shown in their folded positions. Next, the seam 5 is pressed open and the flap 2 on the right half back (considered to be on the wearer of the garment) pressed back so as to overlap the flap on the left half back.

Two lining half backs 6 and 7 are next seamed along a line 8 to a point 8$^a$ and then the left lining half back is notched along the dotted lines shown in Figure VII, the notch being an angular cut including one incision 9 starting at the edge of the material a short distance from the point 8$^a$ then continuing substantially perpendicularly to the seam line 8 after which the incision is extended for about an equal distance diagonally upward at 10. The provision of such a notch is one of the featured originations of my invention.

The notch location is determined and established so that the bottom of the lining, to be finished in the customary manner will assume the proper height or in other words be spaced the proper distance from the lowermost edge of the finished coat. The seamed lining pieces 6 and 7 are now attached to the coat half backs along all the edges, but inasmuch as Figure IX is a broken view only the stitching 11 and 11$^a$ along the bottom and on each side of the vent appears indicated. For this operation the piece consisting of the two coat half backs is turned upside down from the position occupied in Figure V and the lining as shown in Figure VIII is placed thereon, so that the ultimate outside of the coat material and the ultimate inside of the lining are face to face which is to say that the garment as thus assembled is in the inside out position. In this position the edges of the coat half back flap and one lining edge will curl to substantially the positions suggested by the two curved dotted lines in Figure IX. Directing attention to Figure XIII it will be observed that the left composite or lined half back is thrown or folded back preparatory to machine stitching a notch bordering corner area 12 of the lining to the flap on the right coat half back, after making a unique turning adjustment. Such adjustment consists in turning the area 12 to the left, as viewed in Figure XIII, through an angle of substantially one hundred and eighty degrees (180°) so that a point 13 on such lining area 12 is brought over a point 14 on the coat flap and another point 15 on the lining is brought over a point 16 on the coat flap. It will be further observed that a line drawn between the points 13 and 15 and a line drawn between the points 14 and 16 are substantially parallel, or in other words perpendicular to the seam lines 5 and 8 before the turning adjustment has been made. Thereafter, the left unit having been still further raised out of the way, the machine stitch 17 is made with the line between the points 13 and 15 coinciding with the line between the points 14 and 16. While effecting such turning or twisting adjustment the lining has necessarily been drawn upwardly somewhat as suggested by the curls shown at the bottom of Figures XIII and XIV.

The vent construction is now returned to the position shown in Figure XV and after properly adjusting and holding the laminated or juxtaposed relationship as between the coat fabric and the lining, the right side of the vent is seamed up along the dotted line 18 to a point opposite the bottom 8$^a$ of the lining stitch. Then the left side of the vent construction is seamed up along the dotted line 19 to a point of intersection with the notch line as may be seen in Figure XVII. Following this the unfinished garment is turned right side out and Figure XVIII is purposed to reveal the appearance of the notch after the lining on the right side of the vent (the left as viewed in such figure) is drawn slightly to the left. The sectional views XIX, XX and XXI should further aid to an understanding of the disposition of the parts at this stage of manufacture. Figure XXII shows the vent lining on its left side accurately folded over to its proper position and there pressed to establish the overlapping of the lined flap 20, looking at the inside of the coat. While in such position the final machine stitch 21 is made entirely through from front side to back side commencing at the top of the vent and extending a given distance parallel with the bottom of the coat across its left half back.

The construction thus attained as a full lined vent is not only neat, but strong and supplies sufficient weight for the realization of a gravitational restoration of the coat tails to a proper hang and trim appearance.

I claim:—

1. The method of making a lined garment vent which consists in partway seaming two back pieces of fabric and partway seaming two back pieces of lining, bringing together into appropriately juxtaposed and laminated relationship the two pieces of fabric and the two pieces of lining, stitching together the joined fabric pieces and the joined lining pieces around their marginal edges and then stitching together an unseamed lining portion on one side of the garment-back to an unseamed fabric portion on the other side of the garment-back.

2. The method of making a lined garment vent which constists in bringing together into laminated relationship two partway seamed pieces of fabric and two partway seamed pieces of lining juxtaposed in pairs, stitching together the pairs of pieces, cutting a notch in one piece of lining and then stitching a portion of the latter bordering said notch to the fabric of the other pair whereby a vent is provided.

3. The method of making a lined garment vent which consists in partway seaming together a pair of fabric half backs one of which is provided beyond one end of the fabric seam with a flap overlapping the other, partway seaming together a pair of lining half backs one of which is provided beyond one end of the lining seam with a flap, effecting a laminated relationship in pairs between the lining and fabric half backs, notching that lining half back which is substantially juxtaposed to the other of said fabric half backs and then stitching a notch bordering portion of said last mentioned lining half back to the flap of the fabric half back.

4. The method of making a lined garment vent which consists in partway seaming together a pair of fabric half backs, partway seaming together a pair of lining half backs, effecting a laminated relationship in pairs between the lining and fabric half backs, cutting an angular shaped notch into one lining half back, turning a notch bordering portion of said last mentioned lining half back through an arc and then stitching it to a fabric half back.

5. The method of making a lined garment vent which consists in partway seaming together a pair of fabric half backs one of which is provided beyond one end of the fabric seam with a flap overlapping the other, partway seaming together a pair of lining half backs one of which is provided beyond one end of the lining seam with a flap, effecting a laminated relationship in pairs between the lining and fabric half backs, sewing the pairs of lining and fabric half backs together, turning the attached pieces inside out, cutting near the seam end of that lining half back which is substantially juxtaposed to the other of said fabric half backs and an angular shaped notch including a line of cut at a right angle to the line of seam, turning a notch bordering portion of said last mentioned lining half back through an angle of 180° and then stitching it to the fabric half back flap.

6. The method of making a lined garment vent which consists in seaming partway together a pair of fabric half backs one of which is provided beyond one end of the fabric seam with a flap overlapping the other, seaming partway together a pair of lining half backs one of which is provided beyond one end of the lining seam with a flap, effecting a laminated relationship in pairs between the lining and fabric half backs, sewing the pairs of lining and fabric half backs together, turning the attached pieces inside out, cutting a notch into one lining half back, turning a notch bordering portion of said last mentioned lining half back and then stitching it to the fabric half back flap.

7. A garment provided with a vent flap, and a lining piece therefor fashioned with an incision whereby a portion of said lining bordering said incision may be displaced, said portion being sewn to said flap in its displaced position.

8. A garment comprising a pair of half backs sewn together for a given distance to leave a lower portion of their conforming edges free, the free edge of one of said half backs being provided with a flap, a lining piece sewn to one of said half backs and provided with an incision a short distance below the upper end of said flap, a portion of said lining bordering said incision being turned and so sewn to said flap.

9. A garment comprising a pair of half backs sewn together for a given distance to leave a lower portion of their conforming edges free, the free edge of one of said half backs being provided with a flap, a lining piece sewn to one of said half backs and provided with an angular incision commencing at the lateral edge of said lining a short distance below the upper end of said flap extending crosswise and then upward, an upper portion of said lining with respect to said incision line being turned through an angle of about 180° and so sewn to an upper corner of said flap.

Signed by me, this 16 day of January, 1923.

RICHARD A. FEISS.